United States Patent Office 2,793,099
Patented May 21, 1957

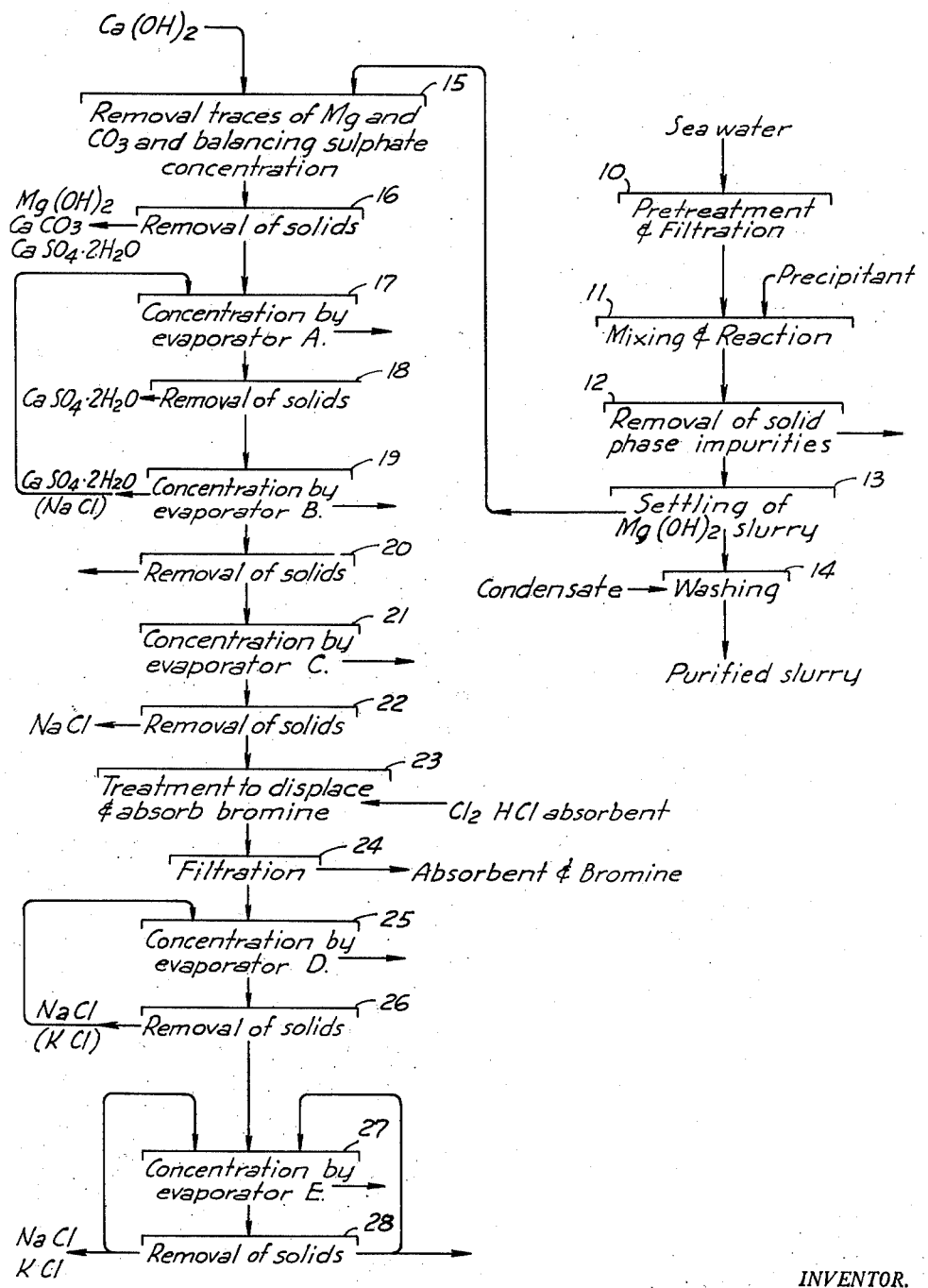

2,793,099

PROCESSES FOR THE MANUFACTURE OF VARIOUS CHEMICALS FROM SEA WATER

Robert E. Clarke, Palo Alto, Calif., assignor to Merck & Co., Inc., Rahway, N. J., a corporation of New Jersey Application May 11, 1953, Serial No. 354,186

1 Claim. (Cl. 23—89)

This invention relates generally to processes for the manufacture of various chemicals from sea water, including magnesium hydroxide, magnesium sulfate, sodium chloride, and other substances.

In the past, magnesium compounds have been manufactured from sea water by processes involving precipitation of magnesium hydroxide by reaction of the sea water with calcined lime or dolomite. Such processes are disclosed for example in Patents 2,021,501 and 2,089,339. The magnesium compounds produced may be for such commercial applications as for the manufacture of magnesia insulation, synthetic magnesite or metallic magnesium, or they may be of such purity as to be suitable for the pharmaceutical trade, as for example milk of magnesia, magnesium hydroxides, magnesium carbonates, or oxides. While theoretically such plants may be located wherever sea water is conveniently available, there are many locations where the manufacture of magnesium compounds cannot be carried out economically, and where investment is such that a plant would not be warranted. This applies particularly to locations where the demands for commercial or pharmaceutical magnesium compounds are limited, or where the market is not favorable from a product price standpoint.

It is well known that sea water contains other valuable chemicals, including particularly sodium chloride, which is commonly recovered from sea water by solar evaporation and crystallization. Recovery of salt from sea water by the use of evaporators has been practiced to a limited extent, but the costs involved have been high because of high equipment and operating expenses.

In some instances both magnesium compounds and salt have been recovered from sea water. Thus after removal of salt by solar evaporation and crystallization, the resulting bittern water has been treated for the precipitation of magnesium hydroxide and for the manufacture of calcium sulfate (gypsum) as a by-product. One difficulty with this process is that the magnesium hydroxide is precipitated as a highly crystalline material, and therefore it is not well adapted for the manufacture of many pharmaceutical compounds, such as milk of magnesia.

It is a general object of this invention to provide a process which will make possible the manufacture of various chemicals from sea water, including magnesium compounds, sodium chloride, calcium sulfate and other substances. A feature of the process is that it makes possible the use of efficient evaporators as for example evaporators of the compression distillation type. Another feature is that it facilitates manufacture of various compounds to a desired degree of purity.

Another object of the invention is to provide a process of the above character which makes possible economical operation in a variety of plant locations, where for example the installation and operation of a conventional sea water plant for the recovery of magnesium compounds might not be economically warranted.

Additional objects of the invention will appear from the following description in which the preferred embodiment of the invention has been set forth in detail in conjunction with the accompanying drawing.

The present invention involves treatment of sea water for the precipitation and removal of magnesium hydroxide. From this product other magnesium compounds can be made, such as magnesium carbonates and oxides. In sea water processes of this character, such as are disclosed in said Patent No. 2,089,339, the overflow water obtained after removal of the magnesium hydroxide slurry, is discharged to waste. In the present invention such overflow water is treated in successive steps for the removal of additional chemicals, including particularly calcium sulfate (gypsum) and sodium chloride.

The procedure illustrated in the flow sheet of accompanying drawing includes pretreatment of the sea water at 10 for the removal of organic and solid phase impurities and for the removal of bicarbonate ion. More specifically the pretreatment can be carried out by chlorinating the sea water to destroy organic matter. Sufficient lime (CaO or Ca(OH)$_2$) is then reacted with the sea water to precipitate from about 5 to 12% of the convertible magnesium salts present. Precipitated solids (Mg(OH)$_2$ and CaCO$_3$) are permitted to settle out and removed as a sludge, with recirculation of the sludge into contact with the incoming sea water. After settlement of precipitated solids the effluent is passed through a suitable sand filter. By means of this treatment a clarified sea water is obtained which is free of organic impurities and bicarbonate ion.

In the next step 11 the pretreated sea water is intermixed with a precipitant such as calcined lime or dolomite, whereby a reaction occurs with the remaining magnesium salts to precipitate magnesium hydroxide. It is convenient to introduce this precipitant in the form of a hydrous slurry, and in an amount theoretically sufficient to react with all of the convertible magnesium salts present. In step 12 the reaction mixture can be treated for the removal of coarse or oversize particles which can be removed by classification. This can be carried out by use of suitable centrifugal separating equipment. Step 12 may in some instances be omitted, particularly where the precipitant has a low content of inert solid phase impurities, such as calcium carbonate, silicious matter, and the like. In step 13 the material is subjected to gravity settlement in a suitable settling tank, whereby precipitated magnesium hydroxide settles down to the lower end of the tank as a slurry, and the mother liquor is discharged as an overflow.

In the next step 14 the magnesium hydroxide slurry is subjected to washing with fresh water to remove soluble impurities, such as sodium chloride. The resulting slurry can then be used for the manufacture of various commercial products, such as milk of magnesia, dried magnesium hydroxide powder, magnesium carbonates and oxides, including refractories.

The overflow removed in step 13 contains substantially all of the ingredients of the original sea water, excepting however that convertible magnesium salts originally present have been reacted with lime to form magnesium hydroxide. As a result of this reaction the brine contains calcium salts, particularly calcium sulfate and calcium chloride. It also contains some bicarbonate ion due to exposure to the atmosphere subsequent to the pretreatment and reaction steps 10 and 11, and traces of unreacted magnesium salts. The presence of even small amounts of magnesium are detrimental to the subsequent phases of the process, particularly because it causes formation of a hard troublesome scale on the evaporating equipment employed.

It may be explained that the concentration of magnesium sulfate in normal sea water is such that when reacted with lime in an amount theoretically sufficient to react with all of the magnesium salts present, the resulting concentration of calcium sulfate in the sea water at normal sea water temperatures, approaches but does not equal saturation. Therefore calcium sulfate does not crystallize out in the steps 12 and 13, but remains in solution in the overflow.

In step 15 carbonate ion and traces of magnesium are removed. This can be carried out by reacting the overflow water with small amounts of calcined lime, which may be added in the form of a reactive calcium hydroxide slurry. The amount of lime used for this purpose can be that required to precipitate remaining traces of magnesium as magnesium hydroxide, and to remove carbonate ion.

At the end of the treatment at 15 the calcium and sulfate should be present in proportions corresponding to their proportioning in gypsum ($CaSO_4.2H_2O$). Assuming that calcium is in excess, which generally will be the case, the amount of sulfate present can be increased to establish the desired balance by contacting the brine with a sulfate producing gas, such as sulfur trioxide ($SO_3$), or sulfur dioxide ($SO_2$) together with chlorine. Instead of adding such a sulfate producing gas, it is possible to add a highly soluble sulfate salt, such as sodium sulfate.

Following reaction at 15 with calcium hydroxide to remove traces of magnesium and carbonate ion, the resulting precipitate, consisting mainly of magnesium hydroxide and calcium carbonate, together with possibly small amounts of calcium sulfate, is removed by filtration in step 16. The resulting effluent is now in condition for subsequent treatment for recovery of calcium sulfate and sodium chloride.

In step 17 the brine is concentrated by evaporation, preferably by the use of suitable evaporator equipment, which has been indicated as evaporator A. For economical operation the evaporator should be one of the compression distillation type utilizing an evaporation cycle in which evolved vapor is continuously compressed and returned to the evaporator for transfer of heat to the brine. Such evaporators are known to those familiar with distillation equipment, and have been applied to the evaporation of salt water. It is desirable to provide a cone or chamber at the lower end of the evaporator which has a mechanical agitator in its upper portion into which material crystallizing from the brine undergoing treatment may settle. This permits a slurry of crystals to be intermittently or continuously removed from the equipment.

In the first evaporator stage 17, it is desirable to concentrate only to the extent of causing crystallization of a major part but not all of the calcium sulfate. Subsequent to evaporation 17 the crystallized calcium sulfate is removed in step 18 as by filtration. Assuming that the evaporator equipment is such that a slurry of calcium sulfate is continuously removed from a settling chamber provided in the same, then the slurry alone can be subjected to filtration at 18, and the resulting effluent, together with effluent directly withdrawn from 17 without calcium sulfate crystals, is supplied to step 19 for further concentration in evaporator B.

In step 19 evaporation is continued to a point sufficient to cause crystallization and precipitation of the remaining calcium sulfate present, together with some sodium chloride. Assuming that a slurry of crystals is being withdrawn from this evaporator, the solids are removed at 20 and recycled to the evaporator A in step 17, as indicated. In this way the concentration of calcium sulfate is built up in the feed to evaporator A, whereby all of the calcium sulfate is removed in step 18, relatively free of contamination with other salts present, such as sodium chloride.

The effluent from step 19 is further concentrated in evaporator C (step 21) to effect crystallization and precipitation of sodium chloride. In step 22 the crystallized salt is removed as by filtration.

In the next step 23 the concentrated effluent is treated for the recovery of bromine. This can be carried out by chlorinating the brine, together with addition of an acid (e. g. hydrochloric) and an adsorbent for the released bromine. Methods of this character are known to those familiar with the recovery of bromine from sea water, and need not be described in detail.

In the next step 24 the adsorbent and bromine are removed as by filtration, and the effluent is then subjected to further concentration in evaporator D (step 25). As a result of such concentration the remainder of the sodium chloride crystallizes from the brine, together with some potassium chloride. The slurry containing such crystallized salts is returned to the feed of the evaporator D as indicated. Effluent from 26 is further concentrated in evaporator E (step 27) whereby both sodium chloride and potassium chloride are crystallized. Crystallized sodium chloride and potassium chloride removed at 28 can be in part recycled to the evaporator E, to build up the percentage of potassium chloride present. Likewise effluent from 28 can be recycled for the same purpose. Recycling to the evaporator E is continued until the amount of crystallized potassium chloride present, in proportion to the amount of sodium chloride, is such that this mixture material can be economically processed by recrystallization for separate recovery of potassium chloride.

As a by-product of evaporation in the various evaporators A to E distilled water is obtained which can be used to advantage at various points of the process. Particularly such distilled water is advantageous for use in the washing operation 14, for the purification of the precipitated magnesium hydroxide. This purification operation can for example be carried out in accordance with the process disclosed in Farnsworth 2,019,488. Use of distilled water for this washing operation is advantageous in that it more effectively removes soluble impurities from the magnesium hydroxide.

It will be evident from the foregoing that the present invention provides a process for the economical recovery of magnesium hydroxide and other chemicals from sea water. Assuming the use of compression distillation, the various evaporating operations can be carried out economically, and without undue power or heat consumption. The bulk of the calcium sulfate and sodium chloride removed are relatively uncontaminated and therefore require little if any further processing before marketing. Because the process combines manufacture of magnesium hydroxide with calcium sulfate, sodium chloride and other chemicals, it is economical for installation in many localities where a plant for manufacture of magnesium hydroxide from seat water would not be warranted. Complete removal of magnesium from the sea water prior to concentration by evaporation greatly facilitates the use of commercial evaporators of the compression distillation type, because it minimizes the formation of hard magnesium containing scale.

I claim:

A process for the recovery of magnesium hydroxide, calcium sulphate and sodium chloride from sea water comprising reacting sea water with a lime containing precipitant for the precipitation of magnesium hydroxide, subjecting the material to a gravity separating operation in which a precipitated magnesium hydroxide slurry is permitted to settle and remaining effluent removed from the slurry, reacting the effluent with calcium hydroxide for removal of remaining traces of magnesium and carbonate ion, removing solids thereby precipitated from the effluent, subjecting the remaining effluent to a first stage of concentration by evaporation to cause crystallization of calcium sulphate, removing crystallized calcium sulphate from the remaining effluent, subjecting the last named effluent to further concentration by evaporation to effect crystallization of remaining calcium sulphate together with some sodium chloride, causing said last named crystallized material to be recycled and introduced into the first evaporating stage, subjecting the effluent from the last named stage of evaporation and crystallization to further concentration by evaporation to effect crystallization of sodium chloride, removing crystallized sodium chloride from said last named operation, and then subjecting the effluent remaining from said last named operation to treatment for removal of bromine.

References Cited in the file of this patent

UNITED STATES PATENTS

| | | |
|---|---|---|
| 1,750,761 | Martin | Mar. 18, 1930 |
| 1,937,995 | Thomsen | Dec. 5, 1933 |
| 2,021,501 | Farnsworth et al. | Nov. 19, 1935 |
| 2,089,339 | Chesny | Aug. 10, 1937 |
| 2,191,411 | Pierce | Feb. 20, 1940 |
| 2,624,654 | Hirsch | Jan. 6, 1953 |

FOREIGN PATENTS

| | | |
|---|---|---|
| 667,822 | Great Britain | Mar. 5, 1952 |

OTHER REFERENCES

"Ind. and Eng. Chem.," vol. 35, No. 8, page 860 (Aug. 1943).

Lowry's "Inorganic Chemistry," 1931 ed., pages 655, 656, MacMillan and Co. Ltd., London.

Thorpe's "Dictionary of Applied Chem.," fourth ed., vol. 10, pages 844–847, Longmans, Green and Co., N. Y.

J. W. Mellor's "Modern Inorganic Chemistry," single vol. ed., Jan. 1935, 8th ed. revised, page 269.